United States Patent
Walz et al.

(10) Patent No.: US 11,912,106 B2
(45) Date of Patent: Feb. 27, 2024

(54) ELECTRIC HEATING DEVICE

(71) Applicant: Eberspächer catem GmbH & Co. KG, Herxheim (DE)

(72) Inventors: Kurt Walz, Hagenbach (DE); Michael Niederer, Kapellen-Drusweiler (DE); Ahmad Asafi, Karlsruhe (DE); Patrick Kachelhoffer, Seebach (FR)

(73) Assignee: Eberspächer catem GmbH & Co. KG, Herxheim (DE)

( * ) Notice: Subject to any disclaimer, the term of this patent is extended or adjusted under 35 U.S.C. 154(b) by 708 days.

(21) Appl. No.: 16/701,861

(22) Filed: Dec. 3, 2019

(65) Prior Publication Data

US 2020/0171920 A1    Jun. 4, 2020

(30) Foreign Application Priority Data

Dec. 3, 2018  (DE) .................. 10 2018 220 858.1

(51) Int. Cl.
| | |
|---|---|
| *F24H 3/04* | (2022.01) |
| *B60H 1/22* | (2006.01) |
| *H05B 3/06* | (2006.01) |
| *H05B 3/30* | (2006.01) |
| *H05B 3/00* | (2006.01) |
| *H05B 3/34* | (2006.01) |

(52) U.S. Cl.
CPC ......... *B60H 1/2225* (2013.01); *F24H 3/0435* (2013.01); *H05B 3/0014* (2013.01); *H05B 3/06* (2013.01); *H05B 3/34* (2013.01); *B60H 2001/2228* (2013.01); *H05B 2203/02* (2013.01)

(58) Field of Classification Search
None
See application file for complete search history.

(56) References Cited

U.S. PATENT DOCUMENTS

| | | | |
|---|---|---|---|
| 4,743,321 A | 5/1988 | Soni et al. | |
| 2009/0026194 A1* | 1/2009 | Bohlender | F24H 9/1872 219/532 |
| 2011/0068090 A1* | 3/2011 | Bohlender | F24H 9/1863 219/202 |
| 2011/0240631 A1 | 10/2011 | Luppold et al. | |
| 2012/0152931 A1* | 6/2012 | Bohlender | F24H 3/0405 219/520 |

(Continued)

FOREIGN PATENT DOCUMENTS

| | | | | |
|---|---|---|---|---|
| DE | 102006018784 A1 * | 6/2007 | ........... | B60H 1/2225 |
| DE | 10 2014 208955 A1 | 11/2015 | | |

(Continued)

*Primary Examiner* — Joseph M. Pelham
(74) *Attorney, Agent, or Firm* — Boyle Fredrickson S.C.

(57) ABSTRACT

An electric heating device, in particular for a motor vehicle, includes a housing which has an inlet and outlet opening for a medium to be heated and which encloses a layered structure. The layered stricture comprises at least one PTC element which is electrically conductively connected to conducting elements leading to connections of different polarity, and heat-emitting elements that are conductively connected on both sides to the PTC element. In order to provide improved heat dissipation, the heat-emitting elements include a panel element that is provided with perforations and that is made of a heat-conducting material.

18 Claims, 4 Drawing Sheets

(56) References Cited

U.S. PATENT DOCUMENTS

| | | | | |
|---|---|---|---|---|
| 2013/0306622 A1* | 11/2013 | Gu | ............................ | H05B 3/24 |
| | | | | 219/534 |
| 2014/0008450 A1* | 1/2014 | Gu | ........................ | F24H 9/1872 |
| | | | | 237/12.3 R |
| 2014/0124494 A1* | 5/2014 | Wei | ......................... | H05B 3/24 |
| | | | | 219/202 |
| 2014/0178054 A1* | 6/2014 | Luppold | ................ | F24H 3/0429 |
| | | | | 392/360 |
| 2015/0043898 A1* | 2/2015 | Gu | ........................... | F24H 3/062 |
| | | | | 392/360 |
| 2015/0343883 A1* | 12/2015 | Gu | ........................ | F24H 9/1872 |
| | | | | 392/347 |
| 2019/0111763 A1* | 4/2019 | Lim | ..................... | B60H 1/2225 |
| 2019/0381862 A1* | 12/2019 | Kim | ....................... | F24H 9/1872 |
| 2020/0307355 A1* | 10/2020 | Couapel | ..................... | F24H 9/02 |
| 2020/0309409 A1* | 10/2020 | Couapel | ................ | F24H 3/0452 |
| 2020/0338961 A1* | 10/2020 | Gu | ............................ | H01C 7/02 |
| 2020/0404748 A1* | 12/2020 | Walz | ................... | B29C 65/4835 |

FOREIGN PATENT DOCUMENTS

| | | | | |
|---|---|---|---|---|
| DE | 102017223782 A1 * | 6/2019 | .............. | H05B 3/12 |
| EP | 0243077 | 10/1987 | | |
| EP | 1 715 276 A2 | 10/2006 | | |
| EP | 2025541 | 2/2009 | | |
| EP | 2242327 | 10/2010 | | |
| EP | 2299201 | 3/2011 | | |
| EP | 2607121 | 6/2013 | | |
| JP | H07 324884 A | 12/1995 | | |
| WO | 2014009013 | 1/2014 | | |
| WO | WO-2018105994 A1 * | 6/2018 | .............. | F21V 17/02 |

\* cited by examiner

ELECTRIC HEATING DEVICE

BACKGROUND OF THE INVENTION

1. Field of the Invention

The present invention relates to an electric heating device with an inlet and outlet opening for a housing which forms a fluid to be heated, which encloses a layered structure comprising at least one PTC element which is electrically conductively connected to conducting elements leading to connections of different polarity, and which comprises heat-emitting elements heat conductively connected on both sides to the PTC element. Such an electric heating device is, for example, known from EP 2 607 121 A1 of the present applicant. Further generic electric heating devices, in particular for a motor vehicle, are known from EP 2 299 201 A1 or EP 2 242 327 A1.

2. Description of the Related Art

In these previously known electric heating devices, the heat-emitting elements extend as ribs between the heat-generating layers of the layered structure, which ribs are formed by the PTC element(s) located one behind the other in a plane and the conductor tracks provided for the current supply to them. The heat-emitting elements consist of meandering bent sheet metal strips which abut against the heat-generating layer directly or with an intermediate layer of an insulating layer (cf. EP 2 873 296 A2).

Effective heat dissipation is important for the efficiency of the electric heating device of the aforementioned type. Therefore, the expert aims to keep the thermal resistance between the heat-generating layer and the heat-emitting elements, which are usually located on both sides of the heat-generating layer, low.

There is still room for improvement.

SUMMARY OF THE INVENTION

In this respect, the present invention suggests to configure the heat-emitting element from a panel element of heat-conducting material provided with perforations. The panel element usually has perforations throughout its entire extent. The panel element can comprise heat-conducting fibers and be configured as knitted or braided fabric, in particular woven fabric from the heat-conducting fibers. The panel element is preferably configured as a mesh of wire. The wire is preferably a metallic wire. Like a simple fabric, the wire mesh prefers alternating "warp and weft threads".

However, a punched sheet can also be used as the panel element, for example an expanded metal or a perforated sheet. A perforated sheet is a sheet metal with a grate of holes punched into the sheet. The sheet is usually a metal sheet. Insofar as a perforated sheet is used, it is preferable to bend the edges of the punched holes out of the plane of the perforated sheet in order to form protrusions protruding from the actual plane of the sheet, on which the medium to be heated is swirled when the heat-emitting element passes over, thereby improving the heat transfer between the heat-conducting element and the medium to be heated.

The housing forming the inlet and outlet openings for the medium to be heated is preferably made of plastic. It encloses the layered structure and forms the inlet and outlet openings, which are preferably arranged in parallel planes. The housing is preferably a frame-shaped housing, which leaves the entire layer structure free within the frame-shaped housing so that the medium to be heated can pass over the layer structure. In this preferred further development, the housing preferably surrounds the layered structure closely so that the medium to be heated and penetrating the frame-shaped housing must necessarily overlap the layered structure and is thus inevitably heated.

The orientation of the inlet and outlet openings relative to the layered structure is preferably such that the medium to be heated penetrates the layered structure in one direction essentially at right angles to the layers of the layered structure.

The conducting elements can directly form the connections for the electrical connection of the conducting elements. Thus, the conducting elements can be made of a punched sheet metal. The conducting elements can have contact lugs for the electrical connection of the respective conducting element or form the same in one piece.

The heat-emitting elements can contact the PTC element directly or with the conducting element as an intermediate layer. It is also possible to apply the heat-emitting element by means of an insulating layer as an intermediate layer and thus indirectly against the conducting element.

The heat-emitting element can only be formed from the panel element provided with the perforations.

A plate-shaped carrier is preferred which is provided between the heat-emitting element and the PTC element and against which the heat-emitting element abuts the PTC element in a heat-conducting manner. Such a plate-shaped carrier basically has the base area of the heat-generating layer. This heat-generating layer can only be formed by one PTC element and/or several PTC elements arranged behind one another in the corresponding layer level and the electrical conducting elements provided for this purpose. The heat-generating layer can also comprise a position frame made of an electrically insulating material which accommodates the PTC element(s) and positions them.

The aforementioned plate-shaped carrier may be formed with the heat-emitting element as a pre-assembled unit, for example welded, crimped or bonded, so that the plate-shaped carrier together with the heat-emitting element may be processed as an intermediate product in the assembly of the electric heating device. The conducting element may further be provided between the plate-shaped carrier and the PTC element. Thus, the conducting element is located in the heat dissipation direction between the heat-emitting element and the PTC element. In this case, the PTC element contacts the heat-emitting element directly or indirectly with a heat-emitting main side surface. In a direct contact system, the conducting element usually does not cover the main side surface of the PTC element or covers it only slightly at most. Instead of an insulating layer, the heat-emitting element can also be applied against an electrically non-insulating sheet and connected to it. This sheet forms the contact surface directly to the PTC element or the conducting element applied to the PTC element.

According to a preferred further configuration of the present invention, the heat-emitting element also forms the conducting element which contacts the PTC element in an electrically conductive manner. In this case, specifically bent segments of the heat-emitting element are configured as formed heating ribs being the best possible to transfer heat and dissipate it from the PTC element to the medium to be heated, whereas other segments of the perforated planar structure are electrically conductively connected to the PTC element to energize it.

According to a preferred further configuration of the present invention, each of the heat-emitting elements is formed from at least one track of the perforated panel element. The perforated panel element is preferably bent for this purpose so that various functional elements are formed from the panel element by plastic deformation. Details are given in the following detailed description of the invention.

BRIEF DESCRIPTION OF THE DRAWINGS

Further details and advantages result from the following description of embodiments in connection with the drawing. Therein.

DETAILED DESCRIPTION

Figure 1:
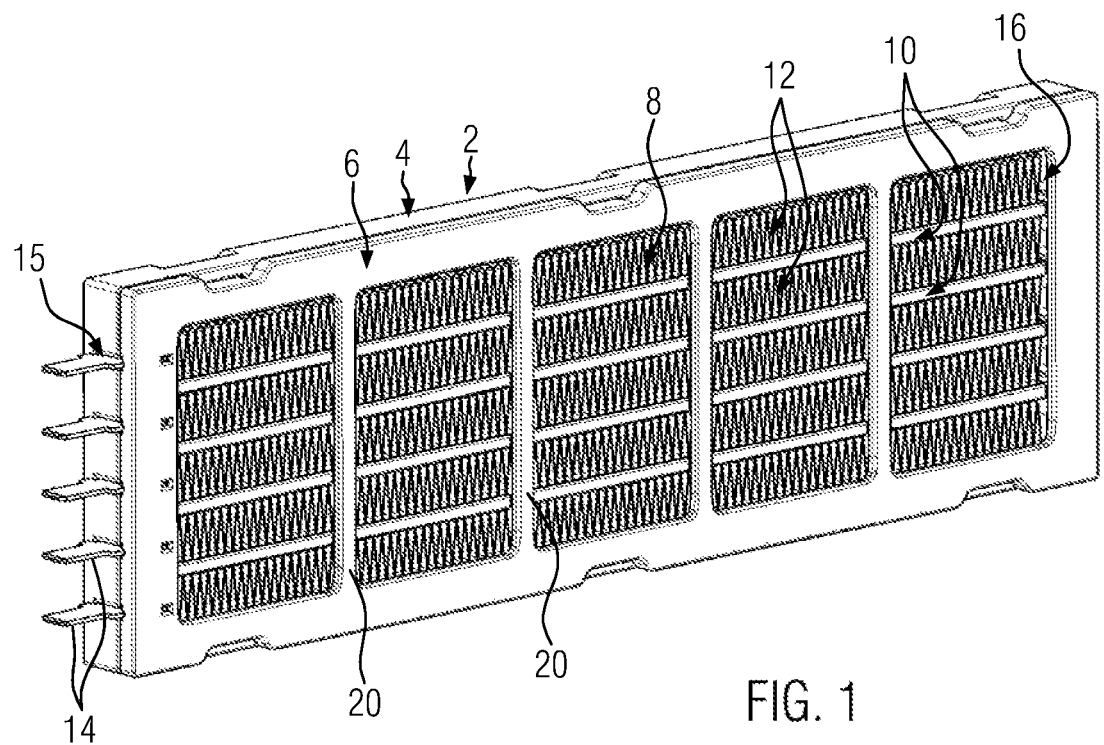
FIG. 1 shows a perspective side view of an embodiment of the electric heating device.

FIG. 1 shows a perspective side view of an embodiment the electric heating device with a frame-shaped housing 2 consisting of a lower housing part 4 and an upper housing part 6. Both housing parts 4, 6 are positively connected to each other and accommodate a heating block 8 as a layered structure which consists of several heat-generating elements 10 arranged in parallel layers to each other and heat-emitting elements 12.

The heat-emitting elements 12 consist of an initially flat and bent wire mesh 14, the exact configuration of which will be explained in more detail in variants below.

The housing 2 made of plastic comprises two opposite frame openings, of which FIG. 1 only shows the frame opening 16 formed by the upper housing part 6, which frame openings provide inlet and/or outlet openings for the medium to be heated. Here, the medium to be heated is air. The embodiment is an air heater.

Figure 2:
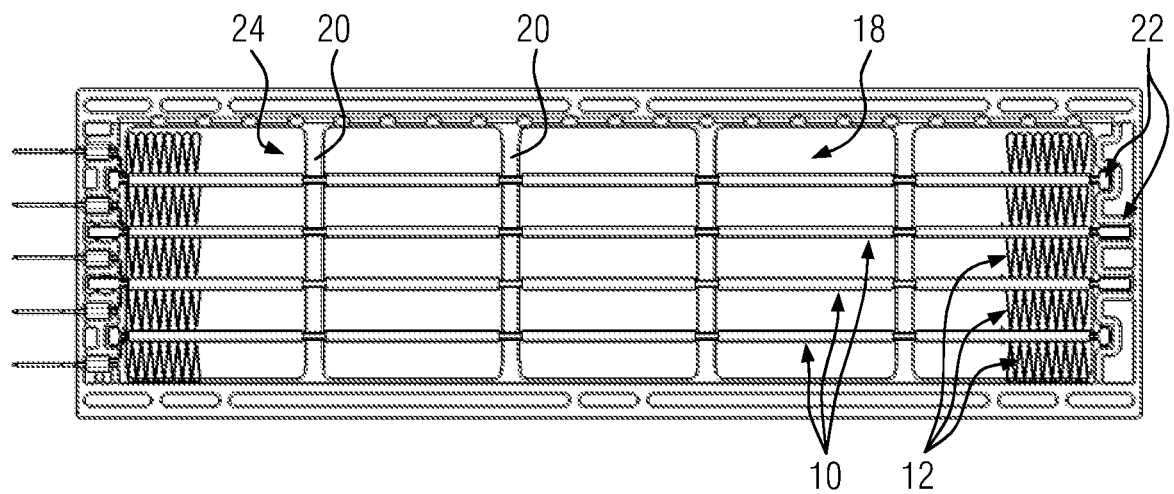
FIG. 2 shows a side view of a lower housing part with the heating block of the embodiment shown in FIG. 1 installed therein.

FIG. 2 shows details of the heating block 8 and its accommodation in particular in the lower housing part 4 and shows the lower housing part 4 in a top view with the upper housing part removed. The heat-emitting elements 12 are shown only incompletely at the respective ends of the lower housing part 4. Accordingly, the illustration in FIG. 2 also provides a view of a frame opening 18 formed by the lower housing part 4.

Figure 3:
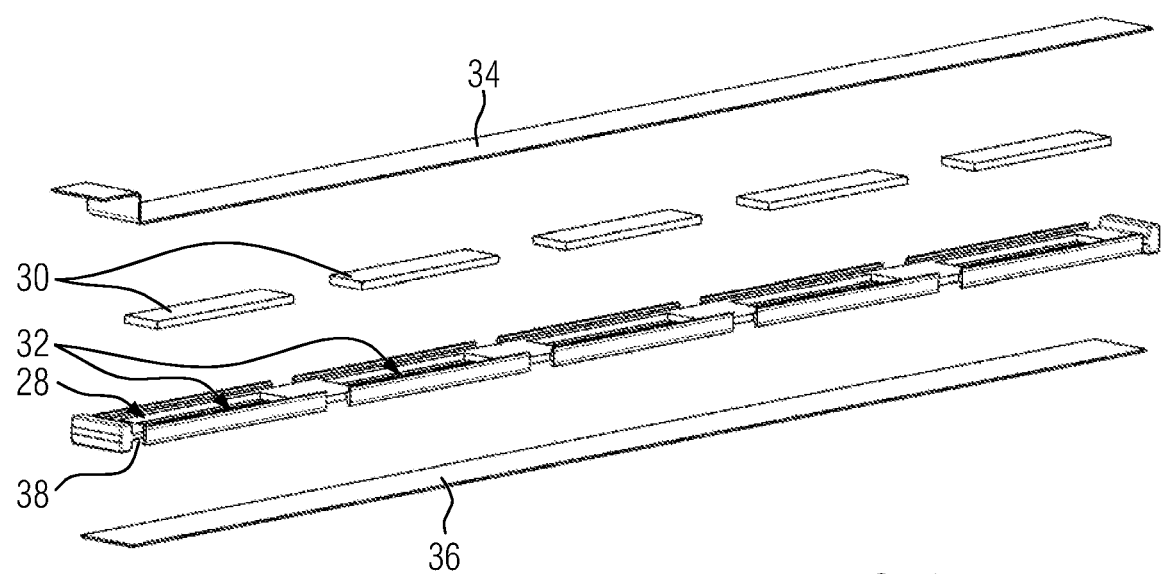
FIG. 3 shows a perspective side view in exploded view of the essential components of an embodiment of a heat-generating element.

As shown in FIG. 3, several PTC elements 30 are accommodated in a position frame 28 made of an insulating material (here plastic) at predetermined positions and positioned by this. Presently, for each individual PTC element 30, an accommodation 32 is recessed in the position frame 28, which comprehensively holds this PTC element 30 and thus fixes it. On both sides of the respective PTC elements 30, which are arranged side by side in one plane, there are sheet metal strips 34, 36, which form electrical conductor tracks for energizing the PTC heating elements 30 and through which the heat generated by the PTC heating elements is conducted to the heat-emitting elements 12 by means of heat transfer. These heat-emitting elements 12 are located directly on the sheet metal strips 34, 36.

Further details of the embodiment are described in EP 2 025 541 A1.

The following description of various configurations of the heat-emitting element 12 according to the present invention is based on the basic structure of the electric heating device discussed above. The description relates to a sheet metal strip 34 against which the heat-emitting element 12 abuts in the embodiment discussed here. As can be seen from the general description, an insulating layer not shown here can also be provided between the heat-emitting element and the contact plate.

Figure 4:
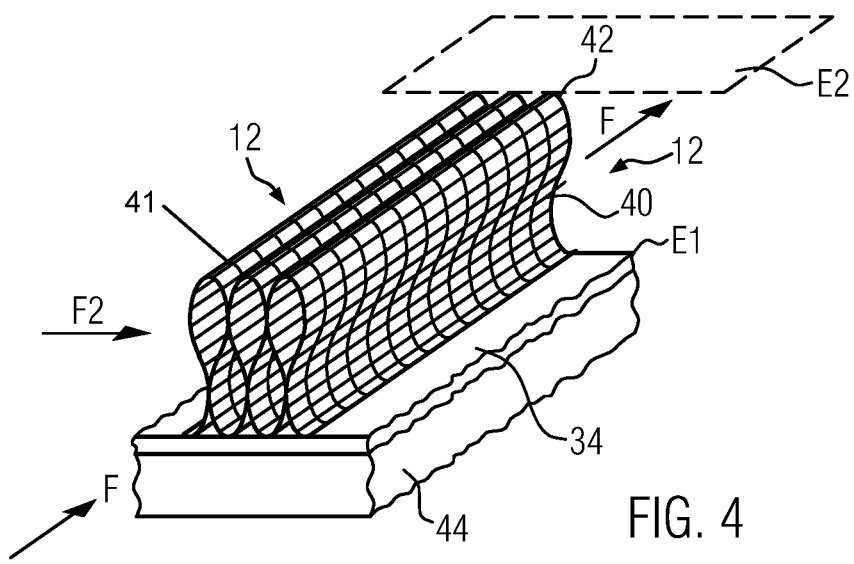
FIG. 4 shows a perspective side view of a first variant of an embodiment of a heat-emitting element.

In the Figures discussed below, the sheet metal strip or, if this is lacking, the PTC element is shown in longitudinal direction with straight edges. The longitudinal direction corresponds to a main extension direction of each individual layer of the layered structure. The longitudinal direction extends transversely to the flow direction of the fluid to be heated, the flow direction of which is indicated by the arrow F. The flow direction F passes through the inlet and outlet openings 16, 18 and thus the housing 2 at right angles. FIG. 4 shows a configuration of the heat-emitting element 13 as it is generally known from the prior art. The heat-emitting element 12 has main side surfaces 40 which extend parallel to the fluid flow F to be heated and essentially transversely to the layers of the layered structure and therefore act like heating ribs 41. The main side surfaces 40 are connected to each other by webs 42 which also extend in the direction of extension of the fluid flow F, but are substantially parallel to the layers of the layered structure and correspondingly parallel to main side surfaces of the PTC element which are identified by reference sign 44 and extend parallel to the upper and lower sides of the respective sheet metal strip 34. Curved transitions are provided between the webs 42 and the main side surfaces 40. The webs 42 extend in two parallel planes, which are planes of the layered structure, wherein the lower plane E1 in the present case coincides with the surface plane of the sheet metal strip 34 and the other plane E2 is provided with a distance from it which corresponds to the transverse extension of the heating ribs 41. The webs 42 are arranged side by side in a direction transverse to the direction of passage F of the medium to be heated.

The fluid to be heated can penetrate the meandering bent web of the wire fabric in a manner known per se, i.e. pass the main side surfaces 40 for heat extraction. Due to the uneven surface of the wire fabric, this also results in a turbulence of the air flow, which leads to an improved heat transfer from the heat-emitting element 12 to the air to be heated.

Figure 5:
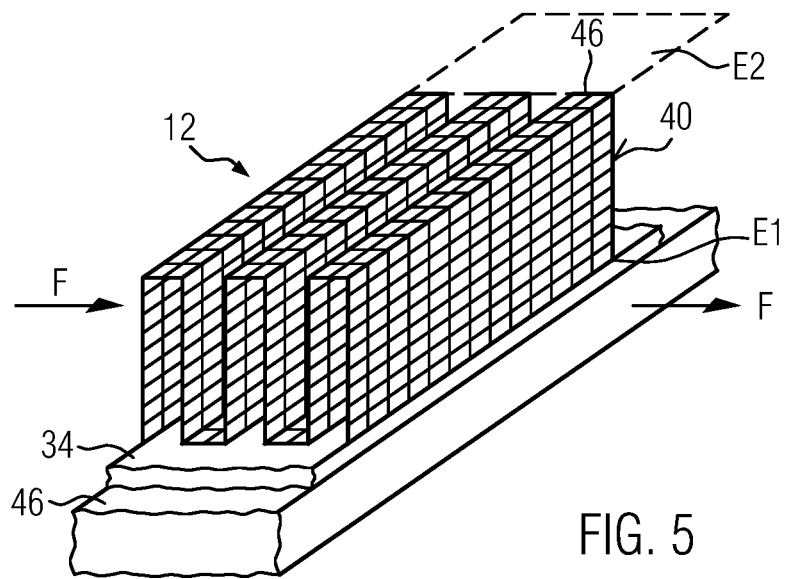
FIG. 5 shows a perspective side view of a second variant of an embodiment of a heat-emitting element.

Also in the embodiment shown in FIG. 5, the main side surfaces 40 of the meandering bent track over webs 46 are arranged in two discrete planes E1, E2 parallel to a heat-emitting main side surface 44 of the PTC element. However, these webs 46 are arranged one behind the other in the penetration direction F of the medium to be heated. In principle, such a configuration is also possible with the specific configuration of the meandering bent track according to FIG. 4 (cf. flow direction F2). Improved heat dissipation through turbulence is achieved in particular by the fact that the fluid flow F to be heated has to pass through the main side surfaces 44 in each case and is thus swirled when the main side surfaces 40 are passed through in each case. This effect is achieved irrespective of whether the bent track is bent in a strictly rectangular manner, as shown in FIG. 5, where the webs 46 branch off at right angles from the main side surfaces 40, or whether a rounded transition is selected between the main side surfaces 40 and the webs 42, as shown in principle in FIG. 4.

Figure 6:
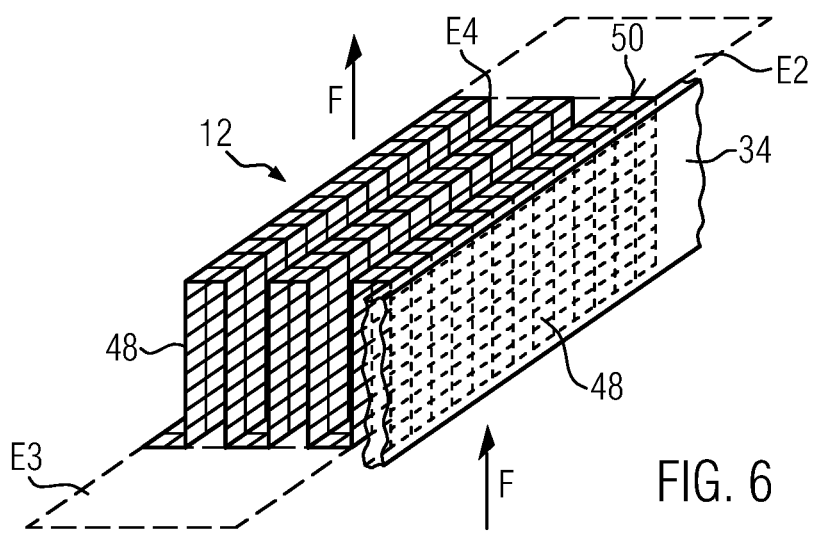
FIG. 6 shows a perspective side view of a third variant of an embodiment of a heat-emitting element.

In the embodiment shown in FIG. 6, the heat-emitting element is also formed from a meandering bent sheet so that several main side surfaces 48 are connected by several webs 50. However, these webs 50 are located at two discrete planes E3, E4, which run parallel to the inlet and outlet openings 16, 18 of the housing 2. Accordingly, the fluid flow F of the medium to be heated penetrates the webs 56 and essentially passes parallel to the main side surfaces 48. Here, too, the non-uniformly smooth surface of the heat-emitting element 12 results in a turbulence at the surface and thus improved heat dissipation. This results in particular from the concrete configuration according to FIG. 6, in which the fluid to be heated must penetrate several webs 50 when it enters the heat-emitting element 12 and is swirled. This turbulence also leads to a disturbance of those air layers which get between the main side surfaces 48 without having to penetrate a web 50.

Figure 7:
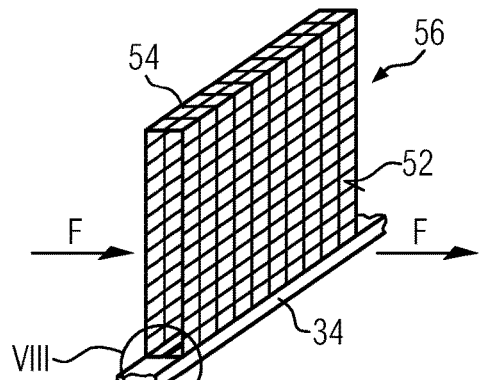
FIG. 7 shows a perspective side view of a fourth variant of an embodiment of a heat-emitting element.

FIG. 7 shows another embodiment of a heat-emitting element of the present invention, which is formed by bending a panel element provided with perforations. This panel element, however, is presently not meanderingly bent. Rather, the structure has two main side surfaces 52 which extend essentially at right angles to the direction of penetration F of the fluid to be heated and which are connected to each other by one single web 54 which extends parallel to the layers of the layer structure. The web 54 is located on the side opposite the PTC element 30. This results in a heat-emitting rib identified with reference symbol 56 in FIG. 7. Opposite to the web 54, the rib 56 can be open. The main side surfaces 52 extend parallel to the inlet and outlet openings 16, 18 of the housing 2. The web 54, on the other hand, extends parallel to the penetration direction F. On the side opposite the web 54, the rib 56 has two fastening segments 58 extending parallel to the web 54, which are formed by bending the panel element/wire mesh and can be glued to the sheet metal strip 34 in order to ensure good heat transfer, see magnified detail in FIG. 8.

Figure 8:
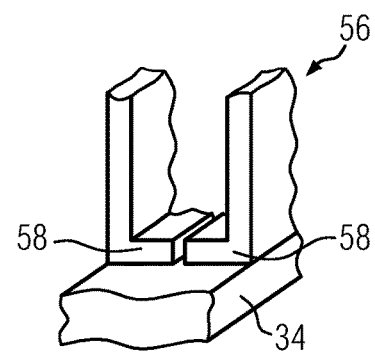
FIG. 8 shows an enlarged perspective side view of detail VIII in FIG. 7.
Figure 9:
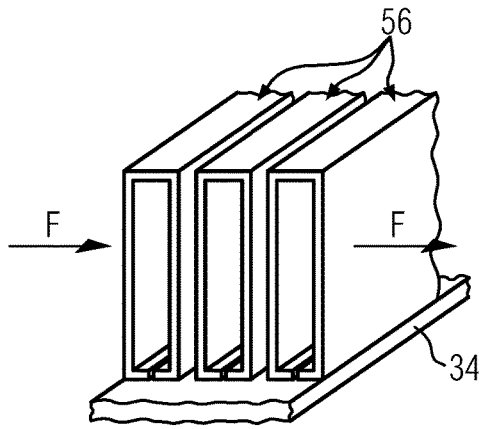
FIG. 9 shows a perspective side view of a fifth variant of an embodiment of a heat-emitting element.

FIG. 9 shows several ribs 56 provided one behind the other in the direction of penetration F of the fluid to be heated, each of which is formed as the rib 56 described for FIGS. 7 and 8 and fixed to the sheet metal strip 34. The ribs 56 can be processed together with the sheet metal strip as a pre-assembled unit by mounting them on the sheet metal strip 34. The ribs 56 can be soldered or glued to the sheet metal strip 34.

The type of mounting between the heat-emitting element 12 and the associated sheet metal strip 34 described above with reference to FIGS. 7 and 9 also applies to the other embodiments. A further sheet metal strip can also be provided, which is only used for contacting and/or pre-assembling the bent panel element and can abut the sheet metal strip 34 or 36 directly or with an intermediate insulating layer.

Figure 10:
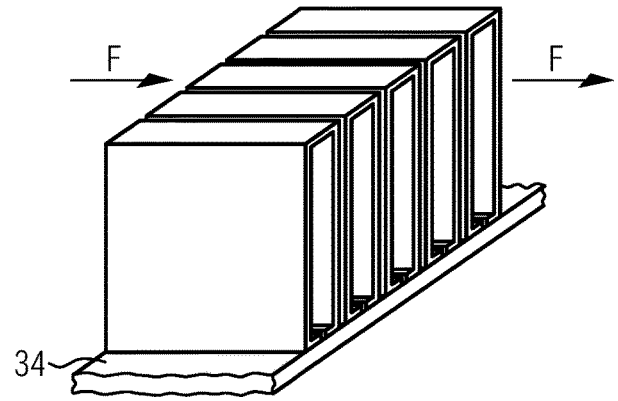
FIG. 10 shows a perspective side view of a sixth variant of an embodiment of a heat-emitting element.

FIG. 10 shows an alternative embodiment in which the heat-emitting element comprises several hollow cylinders 60. These hollow cylinders are formed by bending the panel element and form a cavity 62 which extends at right angles to the layers of the layer structure 34. Accordingly, the hollow cylinders 60 stand on the associated sheet metal strip. FIG. 10 shows rectangular hollow cylinders 60. It goes without saying that the illustrated basic form is only exemplary. The hollow cylinders 60 can have any base surface, thus also be oval, round or polygonally bent. Several hollow cylinders 60 are provided next to each other in one plane of the layer structure at right angles to the direction of penetration F of the fluid to be heated.

Figure 11:
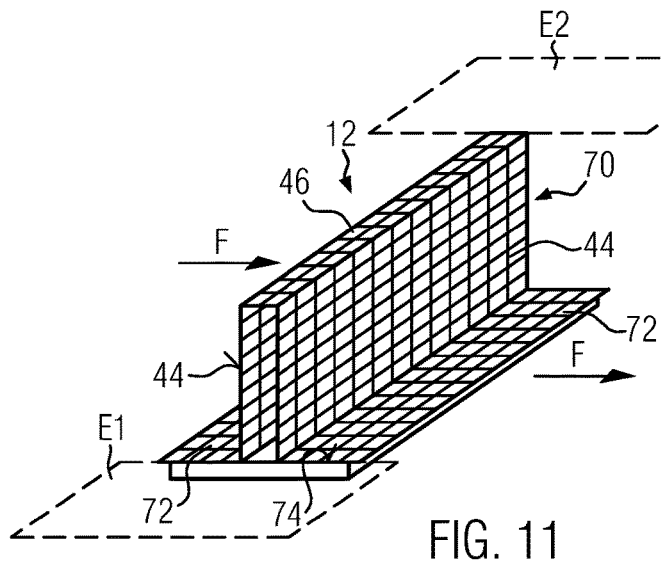
FIG. 11 shows a perspective side view of a seventh variant of an embodiment of a heat-emitting element.

FIG. 11 shows a modification to the embodiment according to FIG. 5. FIG. 11 illustrates only one single rib 70 with two main side surfaces 44, which are connected by only one web 46. Several heating ribs can of course be provided one behind the other in the direction of penetration F of the fluid to be heated as shown in FIG. 5. Fastening segments 72 are formed by bending across the main direction of extension of the rib 70. These fastening segments 72 are directly connected to the main side surface 74 of the PTC element 30. In this embodiment, energization takes place directly through the heat-emitting element 12. For this purpose, this element may have a connecting lug formed by punching the panel element for the introduction of the power current. In the case of a wire mesh, the connecting lug can also be punched out of a sheet metal material and connected to the wire mesh by soldering.

The embodiments discussed above each provide an improved heat dissipation, since the air passing over the heat-emitting elements 12 is swirled on the non-smooth surface of the heat-emitting element 12, resulting in an improved heat transfer.

Figure 12:
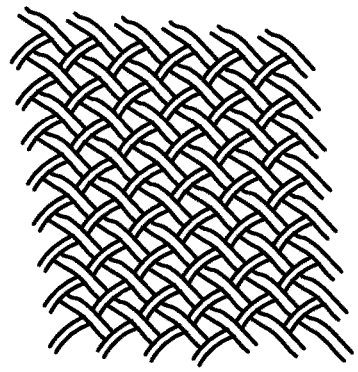
FIG. 12 shows a perspective top view of an embodiment of a panel element provided with perforations.

FIG. 12 shows an example of a panel element 80 in the form of a wire mesh from which the previously discussed configuration of heat-emitting elements 12 can be bent

What is claimed is:

1. An electric heating device for a motor vehicle, comprising:
   a housing having an inlet opening and an outlet opening for a medium to be heated, wherein
   the housing encloses a layered structure comprising at least one PTC element which is electrically conductively connected to connections of different polarity, and which comprises heat-emitting elements that are heat conductively connected on opposed sides to the PTC element;
   wherein the heat-emitting elements include a panel element that is provided with perforations in the form of a mesh wire or an expanded metal or a perforated sheet and that is made of heat-conducting material, wherein the perforations are distributed throughout the entire panel element at a regular interval with no space among them; and
   wherein each of the heat-emitting elements is formed of at least one track of the perforated panel element, which track is meanderingly bent; and
   wherein the panel element forms each heat-emitting element and a conducting element which electrically conductively abuts the PTC element.

2. The electric heating device according to claim 1, wherein each heat-emitting element is formed from the panel element.

3. The electric heating device according to claim 1, wherein each heat-emitting element abuts the PTC element in a heat-conducting manner with an intermediate layer of a plate-shaped carrier located therebetween.

4. The electric heating device according to claim 1, wherein the housing is frame-shaped, and wherein the inlet and outlet openings are formed on opposite sides of the housing and between which the layered structure is exposed.

5. The electric heating device according to claim 1, wherein main side surfaces of the meanderingly bent track are connected to one another via webs which are arranged in two planes lying parallel to a heat-emitting main side surface of the PTC element.

6. The electric heating device according to claim 5, wherein the webs are arranged side by side in a direction transverse to a direction of penetration of the medium to be heated.

7. The electric heating device according to claim 6, wherein the webs are arranged one behind the other in a direction of penetration of the medium to be heated.

8. The electric heating device according to claim 1, wherein main side surfaces of the meandering bent track are connected to one another via webs which are arranged in two planes lying parallel to the inlet opening or the outlet opening.

9. The electric heating device according to claim 1, wherein each of the heat-emitting elements comprises at least one path of the perforated panel element is bent as a heat-emitting rib comprising at least two main side surfaces extending substantially parallel to the inlet and outlet openings, respectively, and a web connecting the main side surfaces on a side opposite the PTC element.

10. The electric heating device according to claim 9, wherein a plurality of ribs are arranged one behind the other in a direction of penetration of the medium to be heated.

11. The electric heating device according to claim 1, wherein each of the heat-emitting elements comprises a plurality of tracks of the perforated panel element, each of which is bent to form a heat-emitting hollow cylinder, a cavity of which extends at right angles to the layers of the layered structure.

12. The electric heating device according to claim 1, wherein the conducting element is formed by at least one bent segment of the heat-emitting element which abuts at least partially against the PTC element.

13. An electric heating device for a motor vehicle, comprising:
a housing having an inlet opening and an outlet opening for a medium to be heated, wherein
the housing encloses a layered structure comprising at least one PTC element which is electrically conductively connected to connections of different polarity, and which comprises heat-emitting elements that are heat conductively connected on opposed sides to the PTC element, wherein
the heat-emitting elements include a panel element that is provided with perforations in the form of a mesh wire or an expanded metal or a perforated sheet and that is made of heat-conducting material, wherein
the perforations are distributed throughout the entire panel element at a regular interval with no space among them, wherein
the panel element is bent so that it has main side surfaces and a web that extends perpendicular thereto and that connects between two of the main side surfaces, and wherein
the panel element forms each heat-emitting element and a conducting element which electrically conductively abuts the PTC element.

14. The electric heating device according to claim 13, wherein the panel element includes a plurality of webs connecting between respective main side surfaces, and wherein the plurality of webs are arranged in two planes lying parallel to a heat-emitting main side surface of a heat-emitting main side surface of the PTC element.

15. The electric heating device according to claim 14, wherein the webs are arranged side by side in a direction transverse to a direction of penetration of the medium to be heated.

16. The electric heating device according to claim 14, wherein the webs are arranged one behind the other in a direction of penetration of the medium to be heated.

17. The electric heating device according to claim 13, wherein the panel element includes a plurality of webs connecting between respective main side surfaces, and wherein the plurality of webs are arranged in two planes lying parallel to the inlet or outlet opening.

18. An electric heating device for a motor vehicle, comprising:
a housing having an inlet opening and an outlet opening for a medium to be heated, wherein
the housing encloses a layered structure comprising at least one PTC element which is electrically conductively connected to connections of different polarity, and which comprises heat-emitting elements that are heat conductively connected on opposed sides to the PTC element;
wherein the heat-emitting elements include a panel element that is provided with perforations in the form of a mesh wire or an expanded metal or a perforated sheet and that is made of heat-conducting material, wherein the perforations are distributed throughout the entire panel element at a regular interval with no space among them; and
wherein each of the heat-emitting elements is formed of at least one track of the perforated panel element, which track is meanderingly bent;
wherein main side surfaces of the meanderingly bent track are connected to one another via webs which are arranged in two planes lying parallel to a heat-emitting main side surface of the PTC element; and
wherein the webs are arranged side by side in a direction transverse to a direction of penetration of the medium to be heated.

* * * * *